United States Patent
Monnier

(10) Patent No.: US 10,756,848 B2
(45) Date of Patent: Aug. 25, 2020

(54) ELECTRONIC DEVICE AND METHOD FOR RECEIVING DATA VIA A REDUNDANT COMMUNICATION NETWORK, RELATED COMMUNICATION SYSTEM AND COMPUTER PROGRAM

(71) Applicant: THALES, Courbevoie (FR)

(72) Inventor: Stéphane Jean-Mary Monnier, Merignac (FR)

(73) Assignee: Thales, Courbevoie (FR)

( * ) Notice: Subject to any disclaimer, the term of this patent is extended or adjusted under 35 U.S.C. 154(b) by 91 days.

(21) Appl. No.: 16/125,660

(22) Filed: Sep. 7, 2018

(65) Prior Publication Data
US 2019/0081734 A1 Mar. 14, 2019

(30) Foreign Application Priority Data
Sep. 12, 2017 (FR) ..................................... 17 00916

(51) Int. Cl.
*H04L 1/00* (2006.01)
*H03M 13/09* (2006.01)
(Continued)

(52) U.S. Cl.
CPC .......... *H04L 1/0061* (2013.01); *H03M 13/09* (2013.01); *H04L 12/403* (2013.01); *H04L 12/40182* (2013.01); *H04L 12/40189* (2013.01); *H04L 63/123* (2013.01); *H04L 63/1441* (2013.01); *H04L 63/18* (2013.01); *H04L 63/1416* (2013.01); *H04L 2012/4028* (2013.01)

(58) Field of Classification Search
CPC ......... H04L 12/40182; H04L 12/40189; H04L 12/403; H04L 1/0061; H04L 63/12; H04L 63/123; H04L 63/1441
See application file for complete search history.

(56) References Cited

U.S. PATENT DOCUMENTS

| | | | |
|---|---|---|---|
| 2003/0126195 A1* | 7/2003 | Reynolds ............ | G06F 11/2023 709/203 |
| 2003/0152077 A1 | 8/2003 | Saint Etienne et al. | |

(Continued)

FOREIGN PATENT DOCUMENTS

FR 2864393 B1 4/2006

OTHER PUBLICATIONS

French Patent Application No. 17 00916, INPI Rapport de Recherche Preliminaire, dated Mar. 14, 2018, 2 pages.

*Primary Examiner* — Mewale A Ambaye
(74) *Attorney, Agent, or Firm* — Soquel Group LLC

(57) ABSTRACT

This electronic device for receiving data via a redundant communication network including at least two independent elementary networks, is configured to be connected to each elementary network, including a receiving module configured to receive, via the redundant communication network, at least one data frame, each frame including a frame identifier and a data field, each frame being transmitted over each of the elementary networks; and a verification module configured, for at least one received frame identifier, to calculate a frame check code for each of the elementary networks, then to compare the frame check codes between the elementary networks, each frame check code depending on the data field of the frame received via the respective elementary network.

8 Claims, 2 Drawing Sheets

(51) Int. Cl.
*H04L 29/06* (2006.01)
*H04L 12/403* (2006.01)
*H04L 12/40* (2006.01)

(56) References Cited

U.S. PATENT DOCUMENTS

| | | | |
|---|---|---|---|
| 2004/0141511 A1* | 7/2004 | Rune | H04L 45/20 370/401 |
| 2005/0132105 A1* | 6/2005 | Hall | G06F 11/1625 710/36 |
| 2005/0147029 A1 | 7/2005 | Gambardella et al. | |
| 2007/0223533 A1* | 9/2007 | Kirrmann | H04L 69/40 370/469 |
| 2008/0126669 A1* | 5/2008 | Muro | H04L 1/0045 711/100 |
| 2011/0311051 A1* | 12/2011 | Resch | H04L 9/3247 380/270 |
| 2015/0089236 A1* | 3/2015 | Han | H04L 9/3271 713/181 |
| 2015/0319010 A1* | 11/2015 | Traversone | H04L 49/351 370/294 |
| 2017/0070989 A1 | 3/2017 | Morel-Fourrier et al. | |

\* cited by examiner

ELECTRONIC DEVICE AND METHOD FOR RECEIVING DATA VIA A REDUNDANT COMMUNICATION NETWORK, RELATED COMMUNICATION SYSTEM AND COMPUTER PROGRAM

CROSS-RELATED APPLICATIONS

This patent application claims the benefit of document FR 17 00916 filed on Sep. 12, 2017, which is hereby incorporated by reference.

FIELD

The present invention relates to an electronic device for receiving data via a redundant communication network comprising at least two independent elementary networks, the electronic device being configured to be connected to each elementary network.

The invention also relates to an electronic data communication system including an electronic transmission device and such an electronic receiving device, connected to one another by a redundant communication network, the communication network comprising at least two independent elementary networks.

The invention also relates to a method for receiving data via a redundant communication network comprising at least two independent elementary networks, the method being carried out by such an electronic receiving device connected to each elementary network.

The invention also relates to a non-transitory computer-readable medium including a computer program including software instructions which, when executed by a computer, implement such a method.

The invention relates to the field of systems communicating with redundant communication networks, in particular avionics communication systems on board aircraft, such as avionics communication systems according to part 7 of standard ARINC 664.

BACKGROUND

Known from document FR 2,864,393 B1 is a redundant communication network of the Ethernet full-duplex switched type, and a method for managing the redundancy of such a network, in particular in the avionics field.

The communication network comprises at least two independent elementary networks each including at least one piece of source equipment and at least one piece of receiving equipment connected to one another by at least one physical link through at least one switch. Each piece of equipment is connected to each elementary network, and each frame emitted by a piece of source equipment over a virtual link over an independent elementary network comprises a number included in a predetermined interval.

In reception by a piece of equipment receiving a frame over a virtual link at a given moment, the method for managing the redundancy includes the definition, for this virtual link, of a window included in said predetermined interval, corresponding to frames already received at that given moment; comparing the number of the received frame with said window, and taking the received frame into account when the frame number is not included in said window.

However, such a redundant communication network and such a method for managing the redundancy are not very robust in terms of cybersecurity and are in particular sensitive to a potential cyber-attack that would compromise one of the elementary networks.

SUMMARY

The aim of the invention is then to propose an electronic device and a method for receiving data via a redundant communication network comprising at least two independent elementary networks, which make it possible to detect a cyberattack more effectively.

To that end, the invention relates to an electronic device for receiving data via a redundant communication network comprising at least two independent elementary networks, the electronic device being configured to be connected to each elementary network and including:

a receiving module configured to receive, via the redundant communication network, at least one data frame, each frame comprising a frame identifier and a data field, each frame being sent over each of the elementary networks, and a verification module configured, for at least one received frame identifier, to calculate a frame check code for each of the elementary networks, then to compare frame check codes between the elementary networks, each frame check code depending on the data field of the frame received via the respective elementary network.

The electronic receiving device according to the invention then makes it possible to verify that the frames received on the various independent elementary networks are consistent with one another and thus to detect any cyberattack that would compromise one of the elementary networks.

The electronic receiving device according to the invention also makes it possible to detect an additional data frame transmitted on only one of the elementary networks.

The electronic receiving device according to the invention also avoids having to store all of the frames received via the different elementary networks, the consistency verification between the received frames being done from the frame check code, such as a CRC code or an FCS code.

According to other advantageous aspects of the invention, the electronic receiving device comprises one or more of the following features, considered alone or according to all technically possible combinations:

the verification module is, for each received frame identifier, configured to calculate the frame check code for each of the elementary networks, then to compare the frame check codes between the elementary networks;

when the redundant communication network comprises only two elementary networks, the verification module is, for the respective frame identifier, configured to compare the frame check code calculated for one elementary network with the frame check code calculated for the other elementary network and to generate an alert in case of inconsistency between the two calculated frame check codes;

when the redundant communication network comprises at least three elementary networks, the verification module is, for the respective frame identifier, configured to compare the frame check codes between the elementary networks via a majority vote algorithm and to generate an alert in case of inconsistency between the calculated frame check codes;

the verification module is further, for at least one received frame identifier, preferably for each received frame identifier, configured to determine a date of receipt by the frame associated with said identifier for each of the elementary networks, to compare the dates of receipt between the elementary networks and verify that the deviation between two dates of receipt is less than or equal to a predefined maximum deviation;

the frame identifier evolves in a predefined manner for frames emitted successively over a same elementary network, and the verification module is further, for at least one received frame, preferably for each new received frame, configured to verify that the frame identifier of the new received frame is consistent with the frame identifier of the previous received frame, in light of the temporal deviation between the date of receipt of the previous frame and the date of receipt of the new frame;

the frame check code is a CDC code or an FCS code; and the device is an avionics device according to part 7 of standard ARINC 664, and the receiving module is configured to receive each frame according to a protocol according to part 7 of standard ARINC 664.

The invention also relates to an electronic data communication system including an electronic transmission device and an electronic receiving device, connected to one another by a redundant communication network, the communication network comprising at least two independent elementary networks, the electronic transmission device being configured to transmit, to the electronic receiving device, at least one data frame on each of the elementary networks, each transmitted frame comprising a frame identifier and a data field, and the electronic receiving device being as defined above.

The invention also relates to a method for receiving data via a redundant communication network comprising at least two independent elementary networks, the method being carried out by an electronic receiving device connected to each elementary network and including:

step for receiving, via the redundant communication network, at least one data frame, each frame comprising a frame identifier and a data field, each frame being sent over each of the elementary networks, a verification step, for at least one received frame identifier, preferably for each received frame identifier, the verification step comprising calculating a frame check code for each of the elementary networks, then comparing frame check codes between the elementary networks, each frame check code depending on the data field of the frame received via the respective elementary network.

The invention also relates to a non-transitory computer-readable medium including a computer program including software instructions which, when executed by a computer, implement a receiving method as defined above.

BRIEF DESCRIPTION OF THE DRAWINGS

These features and advantages of the invention will appear more clearly upon reading the following description, provided solely as a non-limiting example, and done in reference to the appended drawings, in which.

DETAILED DESCRIPTION

Figure 1:
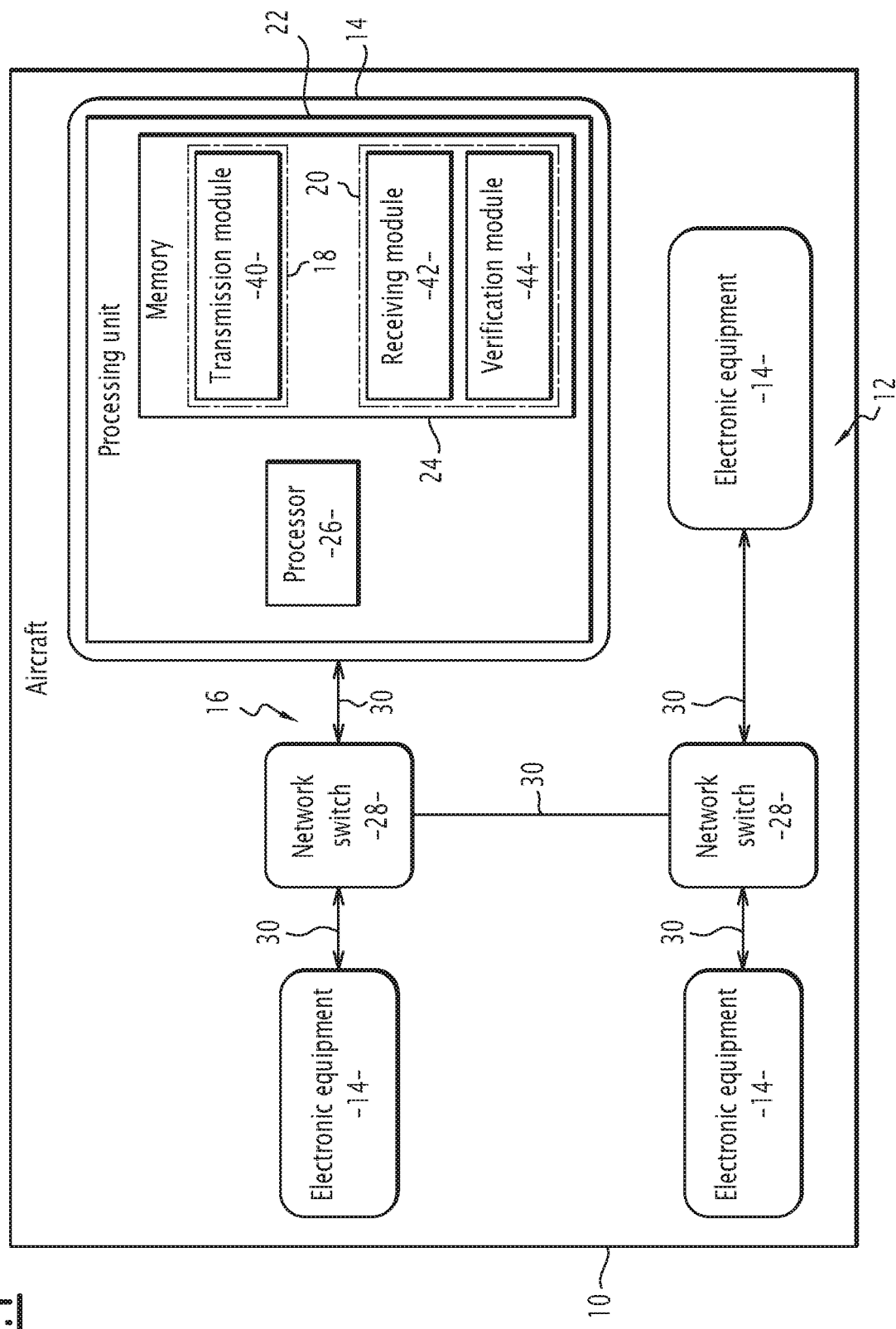
FIG. 1 is a schematic illustration of an aircraft equipped with a communication system according to the invention, including at least two items of avionic equipment connected to one another by a redundant communication network.

In FIG. 1, an aircraft 10 includes a communication system 12 comprising at least two pieces of electronic equipment 14 connected to one another by a redundant communication network 16, such as a redundant Ethernet communication network.

The aircraft 10 is preferably an airplane. Alternatively, the aircraft 10 is a helicopter, or a drone piloted remotely by a pilot.

The communication system 12 comprises several pieces of electronic equipment 14, such as avionics equipment like in the example of FIG. 1, where the communication system 12 is on board the aircraft 10.

The communication system 12 comprises an electronic transmission device 18 and an electronic receiving device 20 connected to one another by the redundant communication network 16.

In the example of FIG. 1, each piece of electronic equipment 14 is preferably configured, on the one hand, to transmit data to the other piece(s) of electronic equipment 14, and on the other hand, to receive data from the other piece(s) of electronic equipment 14. Each piece of electronic equipment 14 then preferably includes the transmission device 18 and the receiving device 20.

One skilled in the art will of course understand that an electronic equipment item 14 that is only intended to send data and not to receive it will then comprise the transmission device 18, but not the receiving device. Conversely, an electronic equipment item 14 that is only intended to receive data from other avionic equipment item(s) 14 will then include the receiving device 20, but not the computing device.

Each electronic equipment item 14 is preferably according to part 7 of standard ARINC 664.

In the example of FIG. 1, each electronic equipment item 14 includes an information processing unit 22, for example made up of a memory 24 associated with a processor 26.

In the example of FIG. 1, a single electronic equipment item 14 is shown in detail with the different devices and modules that it contains, in order to simplify the drawing.

The communication network 16 includes at least one network switch 28 and at least one two-way link 30, each network switch 28 being connected to one or several electronic equipment items 14 via respective two-way links 30. The communication network 16 preferably includes several network switches 28, like in the example of FIG. 1, where the communication network 16 includes two network switches 28 connected to one another by a two-way link 30.

One skilled in the art will understand that, when the communication network 16 is an Ethernet communication network, for example of the switched "full-duplex" Ethernet type, each network switch 28 is an Ethernet network switch, for example of the switched "full-duplex" Ethernet type, and each two-way link 30 is an Ethernet two-way link, for example of the switched "full-duplex" Ethernet type.

The communication network 16 is preferably according to part 7 of standard ARINC 664, and each network switch 28 is then also according to part 7 of standard ARINC 664. The communication network 16 is for example an AFDX (Avionics Full DupleX switched ethernet) network with one or several network switch(es) 28 according to part 7 of standard ARINC 664.

The communication network 16 of the switched "full-duplex" Ethernet type, as defined for example in document US 2003/0152077 A1, is based on the switched full-duplex Ethernet standard described by standard IEEE802.3, and offers improved functionalities relative to this standard to allow better reliability in the transmission of information, in particular in the avionics field.

The communication network 16 offers a deterministic transmission time by adding communication services on the Ethernet network. This deterministic aspect uses a virtual link concept, which is a conceptual representation of a connection of a source equipment item 14 to at least one receiving equipment item 14. Such a virtual link concept makes it possible to isolate data transfers between a source equipment item 14 and receiving equipment items 14. A virtual link is seen as a "pipe" on the network 16.

As described by document F 2,864,393 B1, a virtual link is for example characterized by:
- a transfer direction, the virtual link being a one-way link,
- a single source equipment item 14,
- one or several receiving equipment items 14,
- a frozen bandwidth (maximum number of packets and their size per second),
- a guaranteed maximum transfer time of the packets from a source equipment item 14 to a receiving equipment item 14, irrespective of the behavior of the rest of the network 16, each virtual link having its own transfer time,
- a frozen path on the network 16, and
- a single identifier.

The switch 28 knows, from a static configuration, virtual links that it must switch as well as the number of packets authorized for a virtual link.

This virtual link concept makes it possible to freeze the communications between the equipment items 14 by configuring the routes and the bandwidth allocated to the virtual links. Thus, the flow formed by a virtual link is guaranteed not to be disrupted by the other flows sharing the same physical links all along its route in the network. Furthermore, this virtual link concept makes it possible, through centralized management of the flows, to guarantee that the sum of the bandwidth allocated to the virtual links on a same physical link does not exceed the capabilities of the technology thereof.

The communication network 16 is a redundant communication network and comprises at least two independent elementary networks, redundant with respect to one another. In this case, two electronic equipment items 14, a source equipment item and a receiving equipment item, communicate via at least two independent elementary networks. In a known manner, the redundancy is provided frame by frame on each of said networks.

As an example, on a virtual link, the source equipment successively sends information frames to the receiving equipment. Each of said frames is sent, with an identical data field, onto each of the networks. Based on the load and the configuration of said elementary networks, these two frames may arrive at the receiving equipment at different moments. Here, one is in the case where the two elementary networks work correctly, and therefore the two emitted frames arrive at the receiving equipment item 14.

A data frame, or a data packet, is defined as a data set sent in a single operation over the communication network 16. The data of each frame is not interpreted. The communication network 16 transports it without knowing its meaning.

Each frame comprises a frame identifier and a data field. The frame identifier is included in network data used to convey the frame to its destination. The data field corresponds to the useful data, which is the "payload" of the frame.

Each frame generally comprises a useful data portion and a frame header and footer portion. The frame identifier is then included in the frame header and footer portion, and the data field corresponds to the useful data portion.

In the example of part 7 of standard ARINC 664, the frame identifier is made up of an identifier of the corresponding virtual link, also denoted VL_ID (Virtual Link IDentifier), and a sequence number (SN). The identifier of the corresponding virtual link, or VL_ID, is included in a destination address field, which in turn is included in the frame header and footer portion. The sequence number is a counter for a given virtual link, and is incremented upon each transmission of a frame having the same virtual link identifier (VL_ID), which makes it possible to distinguish two frames associated with the same virtual link. The sequence number, or SN, is also included in the frame header and footer portion.

When the communication network 16 is of the switched "full-duplex" Ethernet type, the redundancy of the network 16 is for example implemented according to the method described in document US 2003/0147377 A1.

Each electronic transmission device 18 is configured to transmit, to the receiving electronic device(s) 20, at least one data frame on each of the elementary networks. Each transmission device 18 is configured to be connected to each elementary network.

In the example of FIG. 1, each transmission device 18 then includes a transmission module 40 configured to transmit, to the receiving electronic device(s) 20, at least one data frame on each of the elementary networks.

Each transmission device 18 is for example an avionics device according to part 7 of standard ARINC 664, and the transmission module 40 is then configured to send each frame according to a protocol according to part 7 of standard ARINC 664.

Each electronic receiving device 20 is configured to receive data, in particular data frames, via the redundant communication network 16. Each receiving device 20 is configured to be connected to each elementary network.

Each receiving device 20 includes a receiving module 42 configured to receive, via the redundant communication network 16, at least one data frame, each frame being sent over each of the elementary networks.

According to the invention, each receiving device 20 includes a verification module 44 configured, for at least one received frame identifier, to calculate a frame check code for each of the elementary networks, then to compare frame check codes between the elementary networks, each frame check code depending on the data field of the frame received via the respective elementary network.

Each receiving device 20 is for example an avionics device according to part 7 of standard ARINC 664, and the receiving module 42 is then configured to receive each frame according to a protocol according to part 7 of standard ARINC 664.

Each network switch 28 is known in itself, and comprises several communication ports, also called connection ports, each communication port being able to be connected to a corresponding electronic equipment item 14.

In the example of FIG. 1, the transmission module 40, the receiving module 42 and the verification module 44 are each made in the form of software executable by the processor 26. The memory 24 is then capable of storing transmission software configured to send at least one data frame over each of the elementary networks to other receiving device(s) 20. The memory 24 is also capable of storing receiving software configured to receive, via the communication network 16, at least one data frame, each frame being transmitted over each of the elementary networks, and verification software configured, for at least one received frame identifier, to calculate a frame check code for each of the elementary networks, then to compare frame check codes between the elementary networks, each frame check code depending on the data field of the frame received via the respective elementary network. The processor 26 of the information processing unit 22 is then able to execute the transmission software in the case of the transmission device 18, or to execute the receiving software and the verification software in the case of the receiving device 20.

In an alternative that is not shown, the transmission module 40, the receiving module 42 and the verification module 44 are each made in the form of a programmable logic component, such as an FPGA (Field Programmable Gate Array), or in the form of a dedicated integrated circuit, such as an ASIC (Applications Specific Integrated Circuit).

The verification module 44 is, for each received frame identifier, configured to calculate the frame check code for each of the elementary networks, then to compare the frame check codes between the elementary networks.

When the redundant communication network 16 comprises only two elementary networks, the verification module 44 is, for the respective frame identifier, configured to compare the frame check code calculated for one elementary network with the frame check code calculated for the other elementary network and to generate an alert in case of inconsistency between the two calculated frame check codes.

Alternatively, when the redundant communication network 16 comprises at least three elementary networks, the verification module 44 is, for the respective frame identifier, configured to compare the frame check codes between the elementary networks via a majority vote algorithm and to generate an alert in case of inconsistency between the calculated frame check codes.

According to this alternative, the majority vote algorithm for example comprises a test of the existence of a majority value from among the set of values of the frame check codes calculated for the set of elementary networks, the majority value being the most frequent value from among said calculated code values, if this value exists.

As an optional addition, the verification module 44 is further, for at least one received frame identifier, configured to determine a date of receipt by the frame associated with said identifier for each of the elementary networks, to compare the dates of receipt between the elementary networks and verify that the deviation between two dates of receipt is less than or equal to a predefined maximum deviation.

The predefined maximum deviation for example corresponds to the skew max defined in part 7 of standard ARINC 664.

According to this optional addition, the verification module 44 is, preferably for each received frame identifier, configured to determine a date of receipt by the frame associated with said identifier for each of the elementary networks, to compare the dates of receipt between the elementary networks and verify that the deviation between two dates of receipt is each time less than or equal to the predefined maximum deviation.

The frame check code is for example an FCS (Frame Check Sequence) code, such as a cyclic redundancy check (CRC) code.

In the example of part 7 of standard ARINC 664, the frame check code is calculated from all of the fields of the frame that are included between the destination address field and the sequence number (SN), inclusive.

One skilled in the art will note that, for a given frame, the frame check code is not necessarily identical from one elementary network to another. In particular, in the example of part 7 of standard ARINC 664, the frame check code differs, for a same frame, from one elementary network to another, the field called MAC Source, included in the frame header and footer portion, indeed being different from one elementary network to another for a same frame.

One skilled in the art will, however, note that when the frame check code is, for a same frame, different from one elementary network to another, then the verification module 44 is for example configured, from the frame received on a first elementary network, to estimate the frame check code expected for the each of the other elementary networks on which the frame is intended to be received. The verification module 44 is next configured to calculate the frame check code for each other elementary network on which that frame is received, then to detect any inconsistency between the two calculated frame check codes for the different elementary networks, in case of difference between the estimated frame check code, from the frame received on the first elementary network, and the calculated frame check code, for the frame received on the other elementary network.

Also as an optional addition, when the frame identifier evolves in a predefined manner for frames emitted successively over a same elementary network, the verification module 44 is further configured to verify, for at least one new received frame, that the frame identifier of the new received frame is consistent with the frame identifier of the previous received frame, in light of the temporal deviation between the date of receipt of the previous frame and the date of receipt of the new frame.

The verification module 44 is preferably configured to perform, for each new received frame, this consistency verification of the frame identifier of the new received frame with respect to the frame identifier of the previous received frame.

As an example, when the transmission 18 and receiving 20 devices are avionics devices according to part 7 of standard ARINC 664, the evolution of the frame identifier consists, for a given elementary network, i.e., for a given VL_ID, of a predefined evolution of the sequence number SN for frames successively emitted over time on the concerned elementary network. The verification module 44 is then configured to verify that the sequence number SN of each new frame received on this elementary network is consistent with the sequence number SN of the previous received frame. Alternatively or additionally, the verification module 44 is configured to verify, from the sequence number SN of a frame received on the elementary network, that the sequence number(s) SN of the next frame(s) received during a predefined time period, such as the skew max, are consistent with said sequence number SN of the current received frame.

In case of frame identifier inconsistency, in particular sequence number SN according to the example of part 7 of standard ARINC 664, the verification module 44 is configured to ignore each new received frame for which such an inconsistency has been detected.

Figure 2:
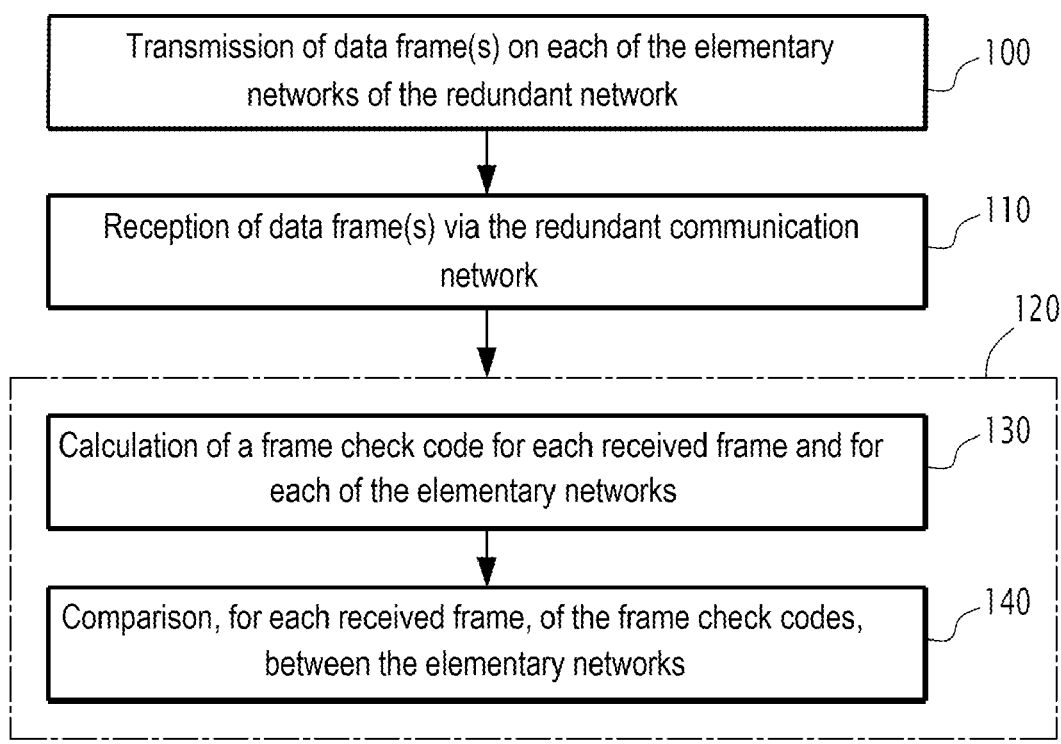
FIG. 2 is a flowchart of a data transmission method within the communication system of FIG. 1.

The operation of the communication system 12 according to the invention will now be explained using FIG. 2, showing a flowchart of the data transmission method within the communication system 12 from a transmission device 18 to receiving device(s) 20 via the redundant communication network 16.

During an initial step 100, the transmission device 18 transmits, via its transmission module 40 and to receiving device(s) 20, one or several data frames on each of the elementary networks of the redundant communication device 16. Each transmitted frame comprises a frame identifier and a data field.

During step 110, each receiving device 20 receives, on each of the elementary networks of the redundant communication network 16 and via its receiving module 42, the transmitted data frame(s).

Each recipient receiving device 20 having received at least one data frame then verifies, during the following step 120 and via its verification module 44, that the frame(s) received on the different elementary networks of the redundant communication network 16 are consistent from one elementary network to the other.

The verification step 120 then comprises a sub-step 130 during which the verification module 44 calculates, for at least one received frame identifier, the frame check code for each of the elementary networks, each frame check code depending on the data field of the frame received via the respective elementary network.

The verification step 120 next comprises a sub-step 140 during which the verification module 44 compares the frame check codes between the elementary networks for said at least one received frame identifier. An alert is generated by the verification module 44 if an inconsistency is detected between the frame check codes during this comparison.

When the redundant communication network 16 comprises only two elementary networks, the comparison is done between the frame check code calculated for one elementary network and the frame check code calculated for the other elementary network, an alert being generated in case of inconsistency between the two calculated frame check codes.

Alternatively, when the redundant communication network 16 comprises at least three elementary networks, the comparison is done via the majority vote algorithm between the at least three frame check codes calculated for each received frame identifier, an alert being generated in case of inconsistency between the frame check codes calculated via the majority vote algorithm.

As an optional addition, the consistency of the frame identifiers received on the other elementary network(s) is verified with respect to the predefined maximum deviation, such as the skew max defined in part 7 of standard ARINC 664. To that end, the verification module 44 then further determines, for at least one received frame identifier, and preferably for each received frame identifier, the date of receipt by the frame associated with said identifier for each of the elementary networks, and next compares the dates of receipt between the elementary networks. It then verifies that the deviation between two dates of receipt is each time less than or equal to the predefined maximum deviation.

Also as an optional addition, when the frame identifier evolves in a predefined manner for frames emitted successively over a same elementary network, the verification module 44 further verifies, for at least one new received frame, and preferably for each new received frame, that the frame identifier of the new received frame is consistent in light of the frame identifier of the previous received frame, taking account of the temporal deviation between the date of receipt of the previous frame and the date of receipt of the new frame.

If an inconsistency in frame identifier is detected, in particular sequence number SN according to the example of part 7 of standard ARINC 664, the verification module 44 ignore the new received frame for which said inconsistency has been detected.

Thus, the receiving device 20 according to the invention makes it possible to detect that the information transmitted over the elementary networks of the redundant communication network 16 is consistent by comparing the frame check code, such as the FCS, of a same frame transmitted over the different elementary networks and verifying that no additional information has been added on one of the elementary networks by monitoring the evolution of the frame marker, i.e., the frame check code.

In the aeronautics context, when the redundant communication network 16 is according to part 7 of standard ARINC 664, this consists of calculating, for each frame accepted by the "first win" algorithm, the frame check code, such as the CRC, of the frame that should be received on the other elementary network(s).

Upon receiving a frame with the same frame identifier and the other elementary network(s), the comparison of the frame check codes then makes it possible to detect any compromise of the elementary network, such as the virtual link.

As an optional addition, the consistency of the identifiers received on the other elementary network(s) during the skew max is verified.

This then makes it possible to verify that the frames received on the elementary networks are consistent with one another. The receiving device 20 then makes it possible to detect different types of malevolent attacks, such as adding an additional frame on a single elementary network, and generally makes it possible to detect a cyberattack on one of the elementary networks of the redundant communication network 16.

One skilled in the art will further understand that the invention makes it possible to verify that this consistency between the elementary networks of the redundant communication network 16 without having to store all of the received data frames, since it suffices to calculate the frame check code for each received frame.

One can thus see that the electronic receiving device 20 and the receiving method according to the invention make it possible to detect a cyberattack more effectively.

The invention claimed is:

1. An electronic device for receiving data via a redundant communication network comprising at least two independent elementary networks, the electronic device being configured to be connected to each elementary network and comprising:
 a receiving module configured to receive, via the redundant communication network, at least one data frame, each data frame comprising a frame identifier and a data field, each data frame being sent over each of the elementary networks, the frame identifier evolving in a predefined manner for data frames sent successively over a same elementary network; and
 a verification module configured, for each data frame, to calculate a frame check code for each of the elementary networks based on the data field of the data frame, to compare frame check codes between the elementary networks, and to verify that the frame identifier of the data frame is consistent with the frame identifier of a previous data frame, in light of the temporal deviation between the date of receipt of the previous data frame and the date of receipt of the data frame.

2. The device according to claim 1, wherein, when the redundant communication network comprises only two elementary networks, said verification module is configured to compare, for each data frame, the frame check code calculated for one elementary network with the frame check code calculated for the other elementary network and to generate an alert in case of inconsistency between the two calculated frame check codes.

3. The device according to claim 1, wherein, when the redundant communication network comprises at least three elementary networks, said verification module is configured to compare, for each data frame, the frame check codes between the elementary networks via a majority vote algorithm and to generate an alert in case of inconsistency between the calculated frame check codes.

4. The device according to claim 1, wherein the verification module is further configured to determine, for each data frame, a date of receipt of the data frame for each of the elementary networks, to compare the dates of receipt between the elementary networks, and to verify that the deviation between two of the dates of receipt is less than or equal to a predefined maximum deviation.

5. The device according to claim 1, wherein the device is an avionics device according to part 7 of standard ARINC 664, and said receiving module is configured to receive each data frame according to a protocol according to part 7 of standard ARINC 664.

6. An electronic data communication system comprising:
an electronic transmission device; and
an electronic receiving device, comprising:
a receiving module configured to receive from said electronic transmission device, via a redundant communication network comprising at least two independent elementary networks, at least one data frame, each data frame comprising a frame identifier and a data field, each data frame being sent over each of the elementary networks, the frame identifier evolving in a predefined manner for data frames sent successively over a same elementary network; and
a verification module configured to calculate, for each data frame, a frame check code for each of the elementary networks based on the data field of the data frame, to compare frame check codes between the elementary networks, and to verify that the frame identifier of the data frame is consistent with the frame identifier of a previous data frame, in light of the temporal deviation between the date of receipt of the previous data frame and the date of receipt of the data frame.

7. A method for receiving data via a redundant communication network comprising at least two independent elementary networks, the method being carried out by an electronic receiving device connected to each elementary network and comprising:
receiving, via the redundant communication network, at least one data frame, each data frame comprising a frame identifier and a data field, each data frame being sent over each of the elementary networks; and
verifying each data frame, comprising:
calculating a frame check code for each of the elementary networks based on the data field of the data frame;
comparing frame check codes between the elementary networks; and
verifying that the frame identifier of the data frame is consistent with the frame identifier of a previous data frame, in light of the temporal deviation between the date of receipt of the previous data frame and the date of receipt of the data frame.

8. A non-transitory computer-readable medium including a computer program comprising software instructions which, when executed by a computer, cause the computer to:
receive, via a redundant communication network comprising at least two independent elementary networks, at least one data frame, each data frame comprising a frame identifier and a data field, each data frame being sent over each of the elementary networks; and
verify each data frame, comprising:
calculate a frame check code for each of the elementary networks based on the data field of the data frame;
compare frame check codes between the elementary networks; and
verify that the frame identifier of the data frame is consistent with the frame identifier of a previous data frame, in light of the temporal deviation between the date of receipt of the previous data frame.

\* \* \* \* \*